(12) United States Patent
Clark et al.

(10) Patent No.: US 11,084,113 B2
(45) Date of Patent: Aug. 10, 2021

(54) WAX WELDING APPARATUS AND METHOD OF USE

(71) Applicant: PCC STRUCTURALS, INC., Portland, OR (US)

(72) Inventors: Connie A. Clark, Ridgefield, WA (US); Hoa Nguyen, Cypress, CA (US)

(73) Assignee: PCC STRUCTURAIS, INC., Portland, OR (US)

( * ) Notice: Subject to any disclaimer, the term of this patent is extended or adjusted under 35 U.S.C. 154(b) by 853 days.

(21) Appl. No.: 15/467,864

(22) Filed: Mar. 23, 2017

(65) Prior Publication Data

US 2018/0272452 A1 Sep. 27, 2018

(51) Int. Cl.
| | |
|---|---|
| *B23K 3/047* | (2006.01) |
| *B22C 7/02* | (2006.01) |
| *H05B 3/26* | (2006.01) |
| *B23K 3/03* | (2006.01) |

(52) U.S. Cl.
CPC ............... *B23K 3/047* (2013.01); *B22C 7/02* (2013.01); *B22C 7/026* (2013.01); *B23K 3/0338* (2013.01); *H05B 3/262* (2013.01); *H05B 2203/03* (2013.01)

(58) Field of Classification Search
CPC ...... B23K 3/047; B23K 3/0338; B23K 3/033; B22C 7/02; B22C 7/026; H05B 3/262; H05B 3/42; H05B 3/02; H05B 1/023; H05B 3/46; A61B 18/082; A41H 43/00; A01K 59/02; B26B 3/00; B26B 7/00; A61C 13/20; A61C 13/0028; D06F 75/26; G05D 23/1917; G05D 23/24

USPC ....... 219/229, 219, 227, 241, 237, 238, 530, 219/531, 533, 536, 540, 544, 421, 433, 219/479, 521, 242, 230, 506, 497, 501; 340/588; 433/32; 222/146.5
See application file for complete search history.

(56) References Cited

U.S. PATENT DOCUMENTS

| | | | | |
|---|---|---|---|---|
| 1,496,077 | A | * 6/1924 | Whipple | .............. B23K 3/0353 |
| | | | | 219/237 |
| 4,074,110 | A | 2/1978 | Slaughter | |
| 4,546,560 | A | * 10/1985 | Granata | .................. D06F 75/30 |
| | | | | 219/229 |

(Continued)

FOREIGN PATENT DOCUMENTS

EP 2224783 9/2010

OTHER PUBLICATIONS

METCAL brochure for SmartHeat® Technology, Power on Demand vs Fixed Power.

(Continued)

*Primary Examiner* — Sang Y Paik
*Assistant Examiner* — Diallo I Duniver
(74) *Attorney, Agent, or Firm* — Burris Law, PLLC

(57) ABSTRACT

An apparatus for wax welding is provided that includes a removable cartridge adapted for operative engagement with a power supply. The removable cartridge includes a tube defining a proximal end portion, a distal end portion, a longitudinal axis, and a hollow bore, and a self-regulating heater is disposed within the tube. The apparatus further includes a tip secured to the distal end portion of the tube within the hollow bore, the tip defining a proximal end portion having an internal cavity. The tip defines an upper surface, a lower surface, and the tip is oriented relative to a longitudinal axis of the cartridge.

19 Claims, 15 Drawing Sheets

(56) References Cited

U.S. PATENT DOCUMENTS

| | | | |
|---|---|---|---|
| 5,427,846 A | 6/1995 | McGaffigan | |
| 5,569,400 A * | 10/1996 | Lee | B23K 3/0392 |
| | | | 219/233 |
| 5,837,973 A * | 11/1998 | Tamura | B23K 3/033 |
| | | | 219/241 |
| 6,386,423 B1 * | 5/2002 | Adler | B23K 3/026 |
| | | | 228/51 |
| 8,082,972 B1 | 12/2011 | Phipps | |
| 8,309,877 B2 * | 11/2012 | Teraoka | B23K 3/03 |
| | | | 219/229 |

OTHER PUBLICATIONS

International Search Report for International Application PCT/US2018/024054, dated Aug. 10, 2018.

* cited by examiner

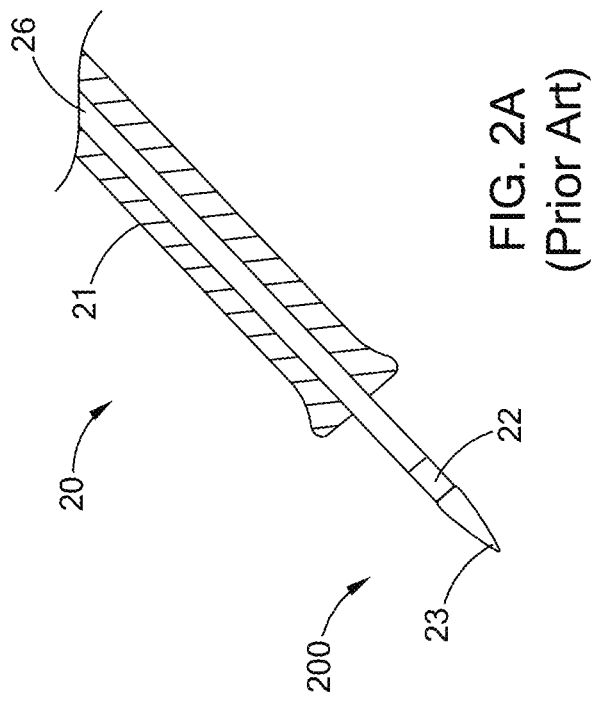
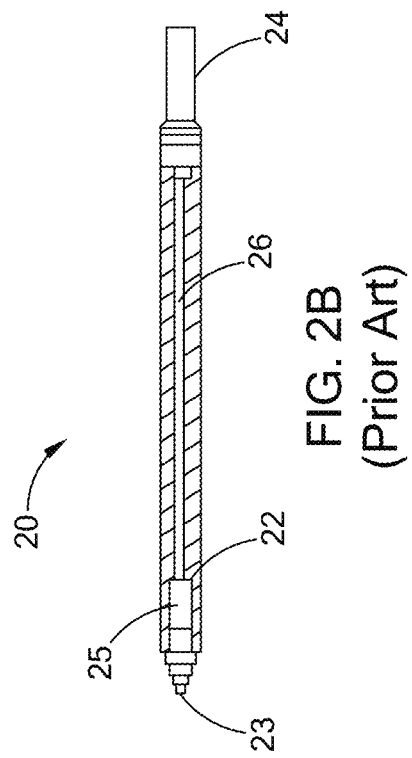
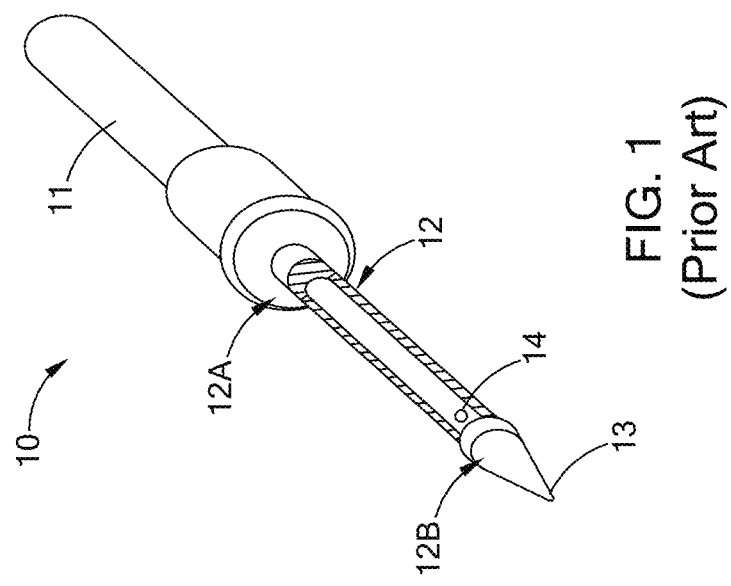
FIG. 2A (Prior Art)
FIG. 2B (Prior Art)
FIG. 1 (Prior Art)

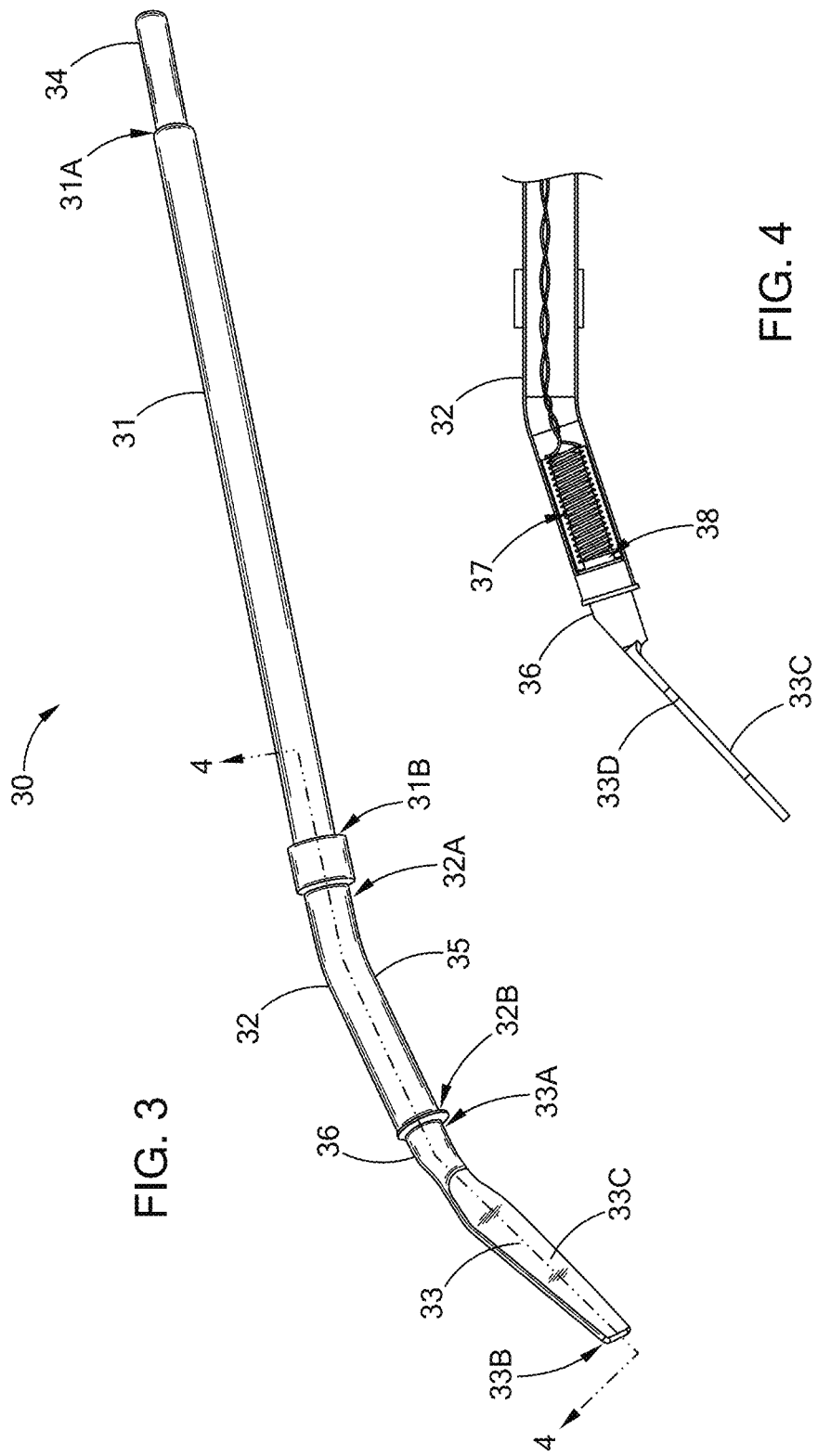

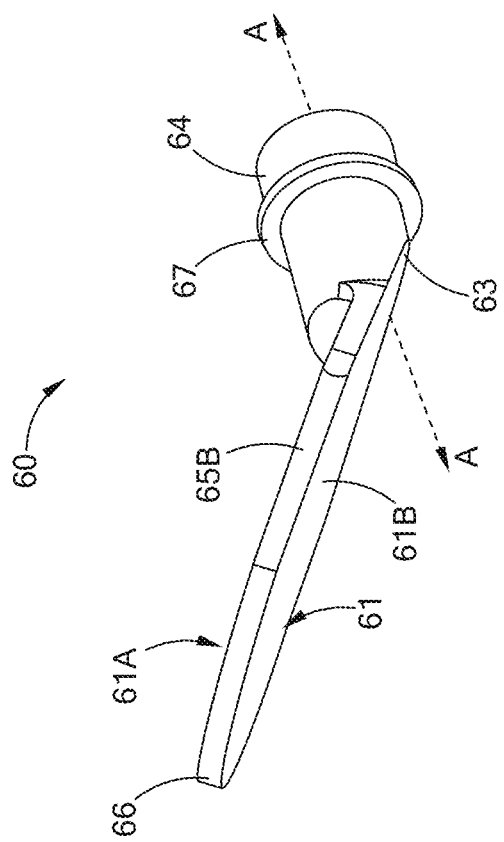
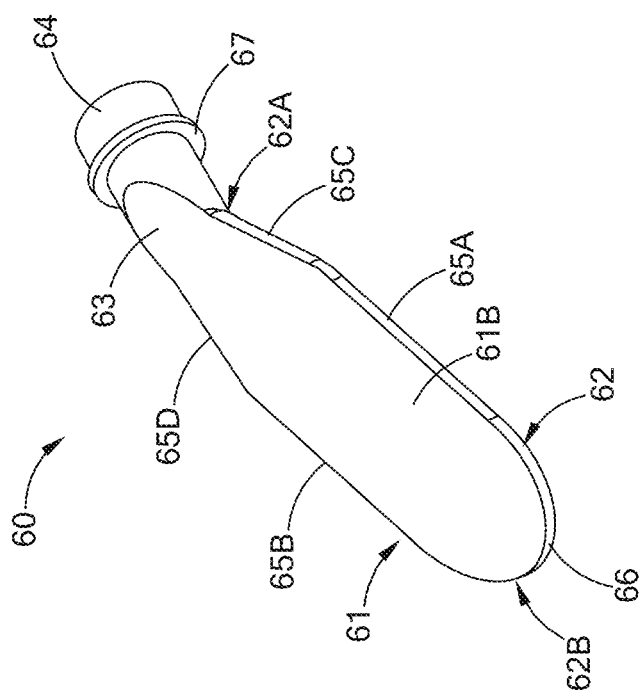
FIG. 6B
FIG. 6A

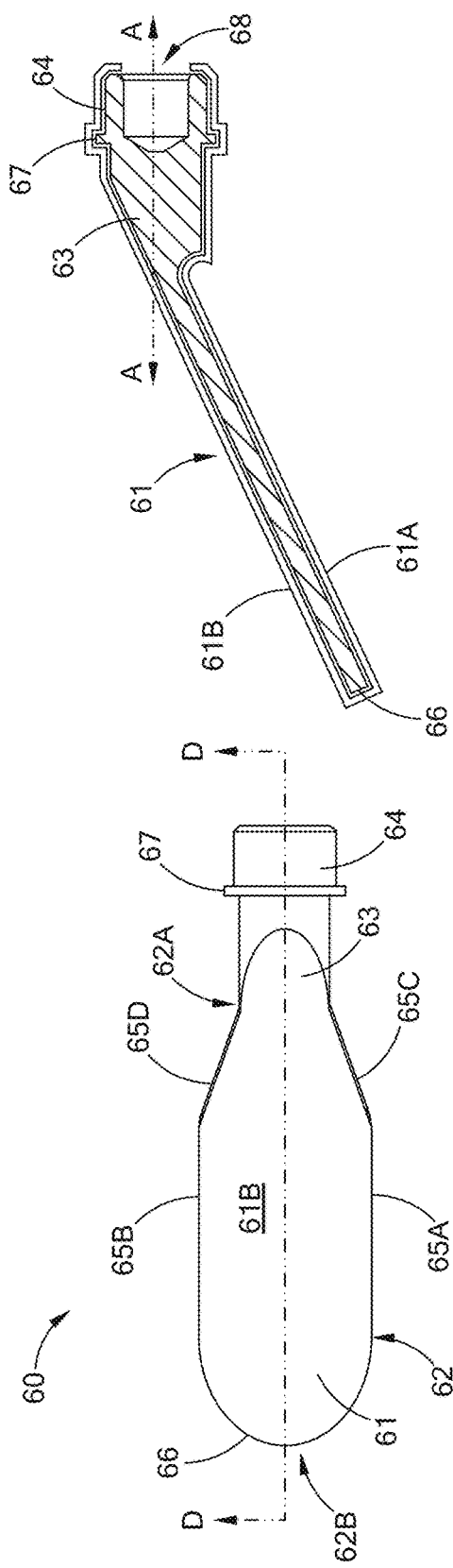
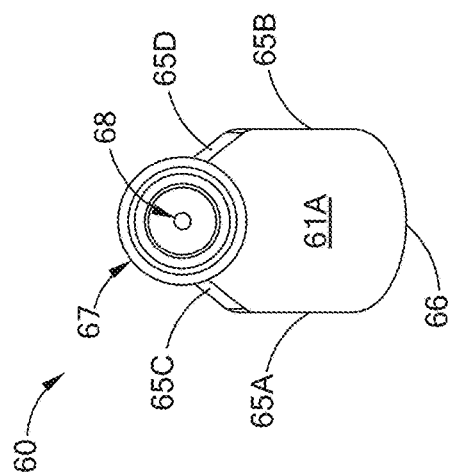
FIG. 6C
FIG. 6D
FIG. 6E

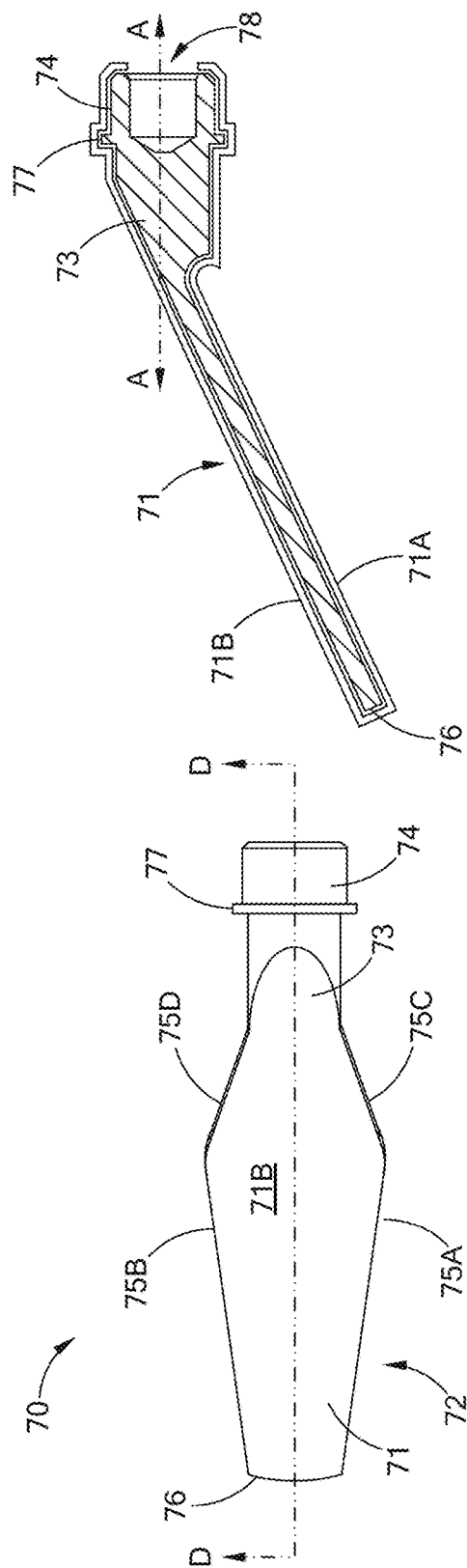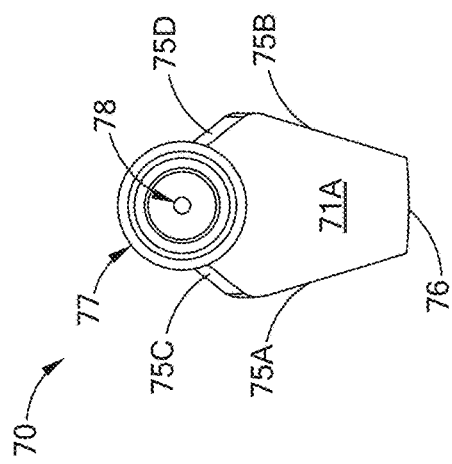
FIG. 7C
FIG. 7D
FIG. 7E

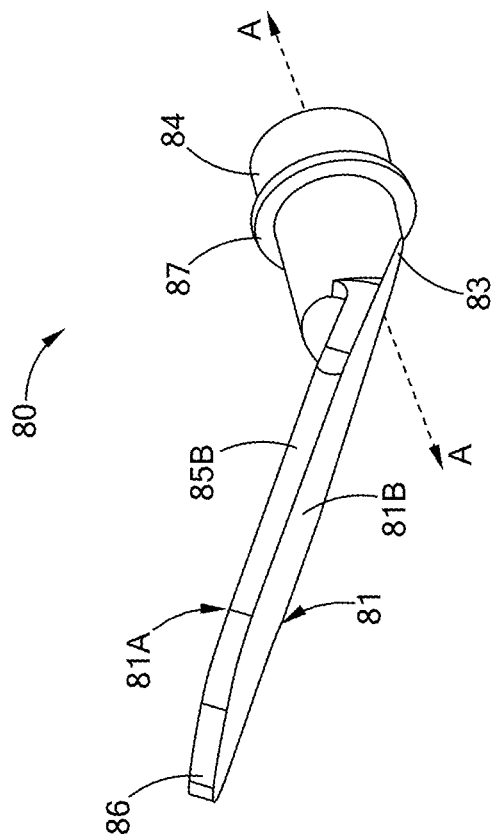
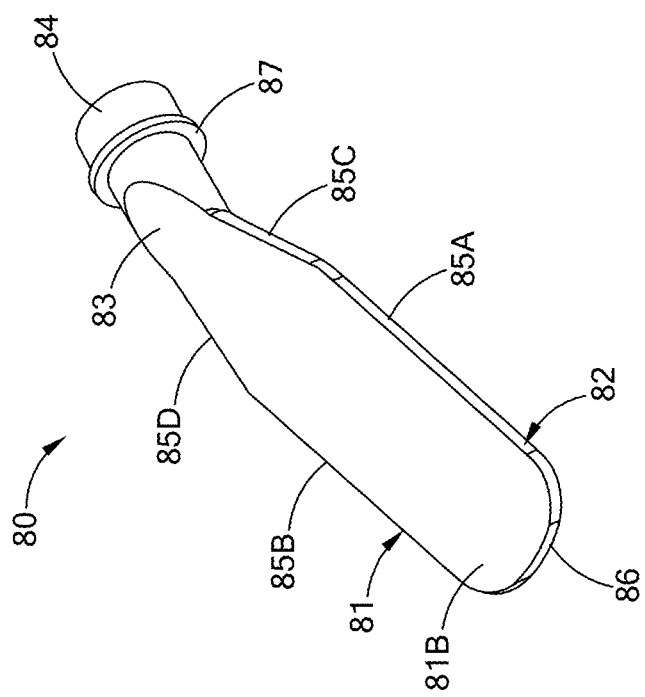
FIG. 8B
FIG. 8A

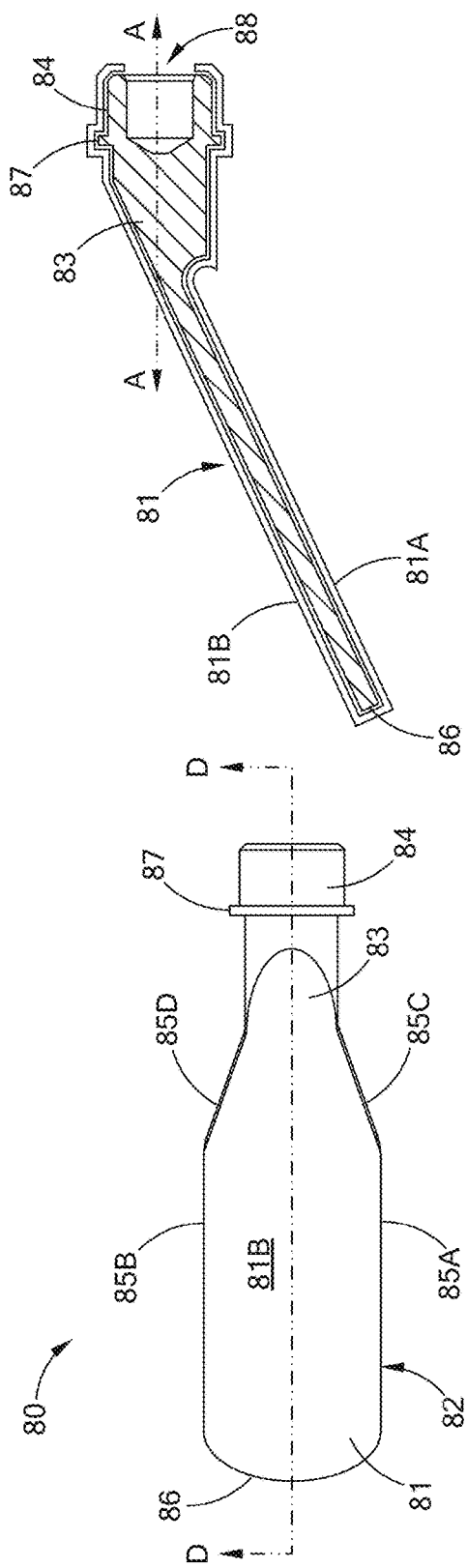
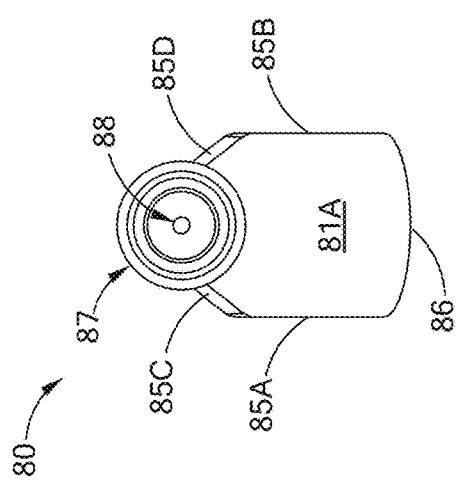

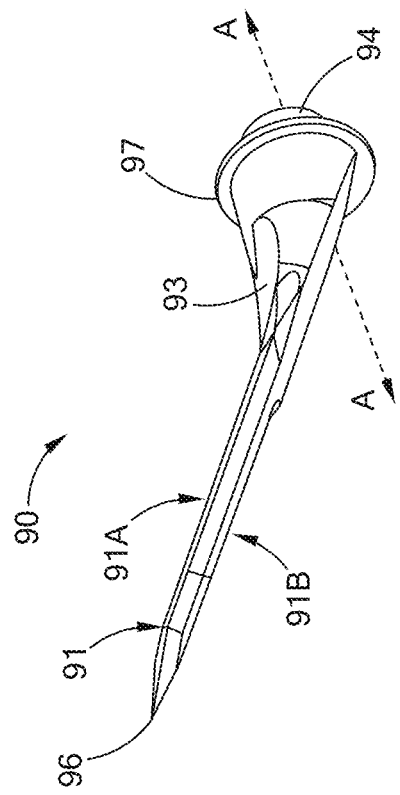
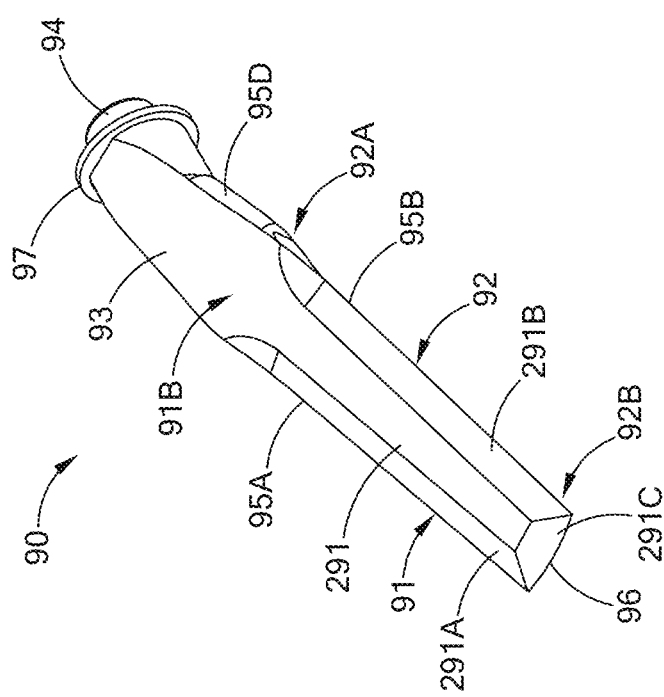
FIG. 9B
FIG. 9A

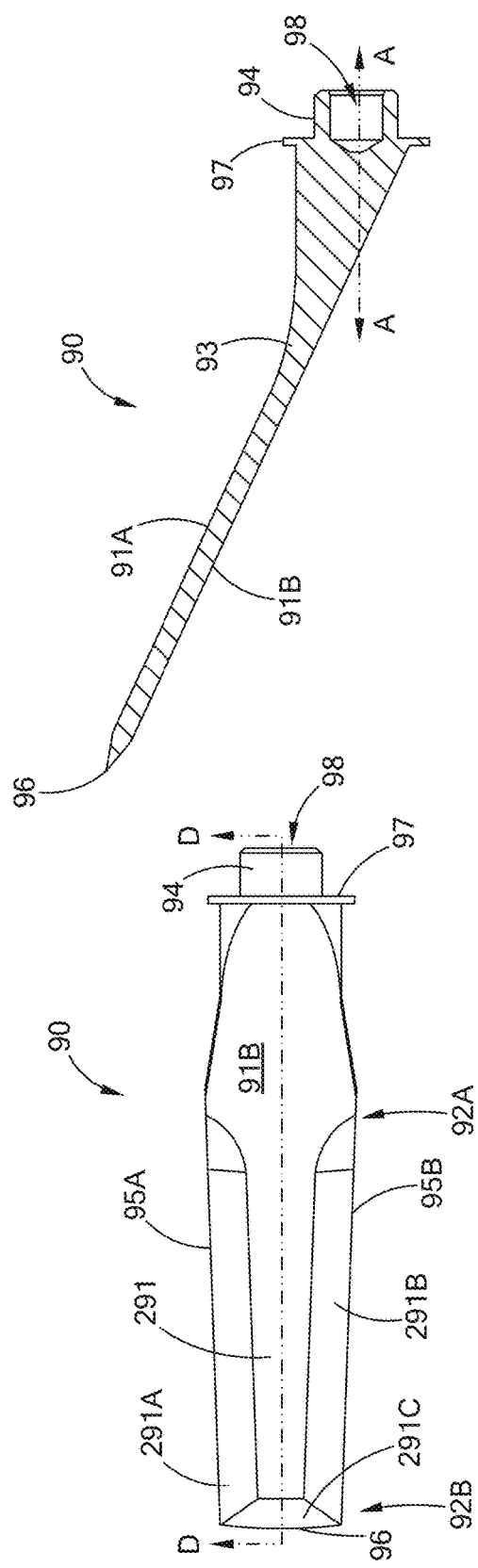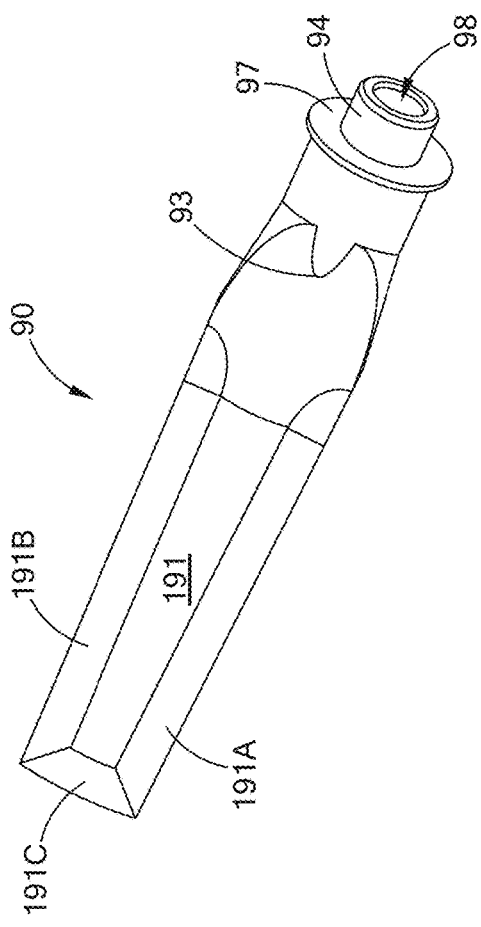
FIG. 9D
FIG. 9C
FIG. 9E

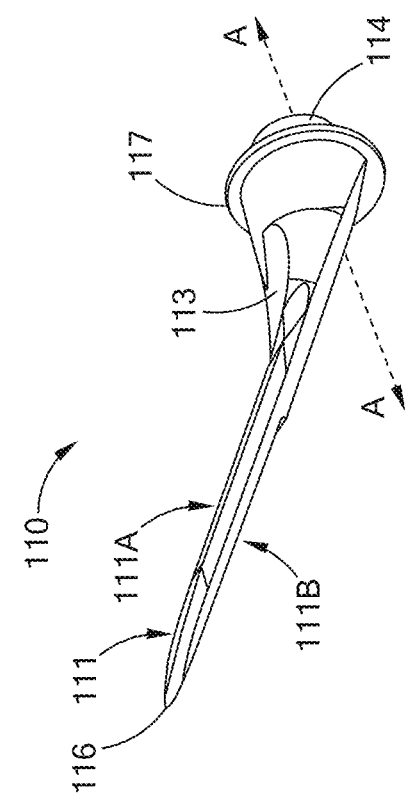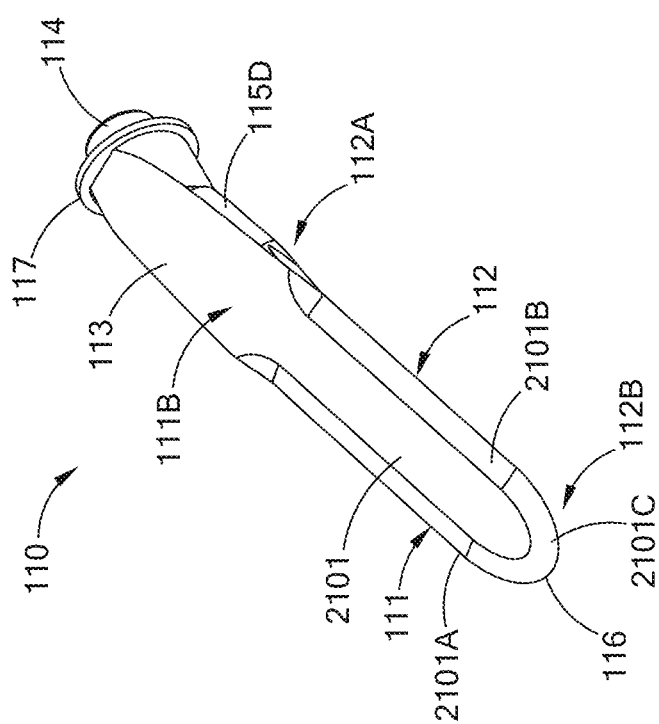
FIG. 10B
FIG. 10A

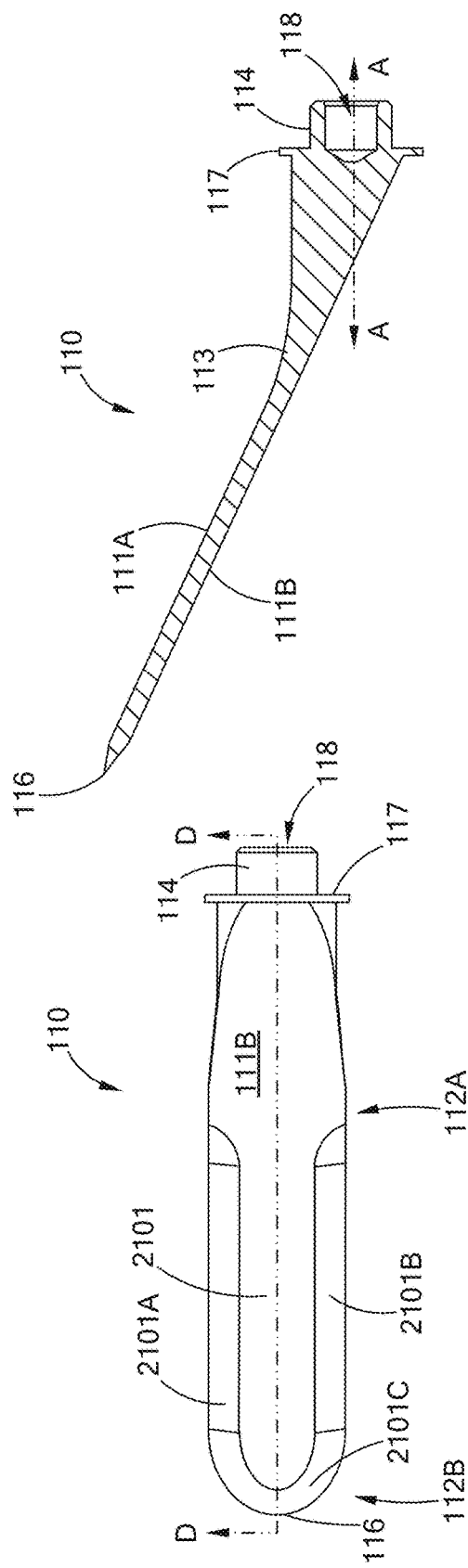
FIG. 10C
FIG. 10D
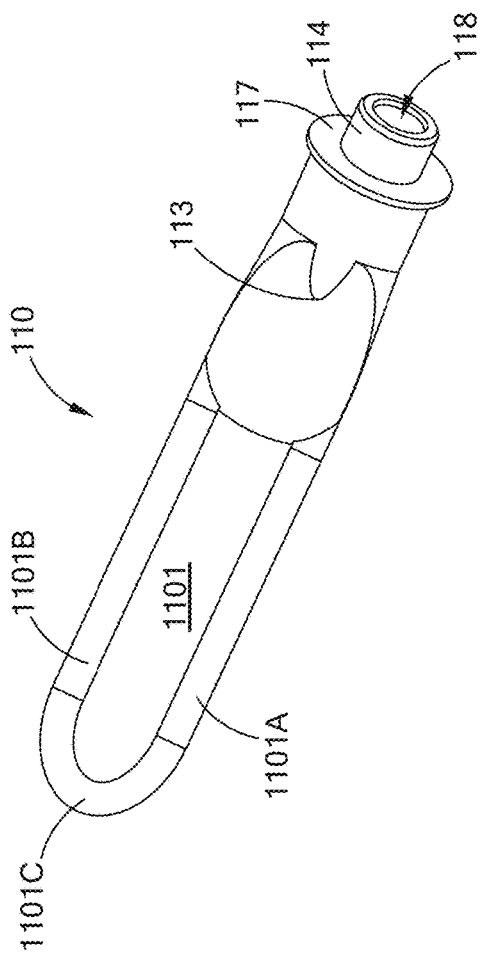
FIG. 10E

Improved Welding Tip (seconds)

| Process | Weld | Total to Finish |
|---|---|---|
| Gate to Gate | 15.49 | 25.73 |
| Pattern to Gate | 22.75 | 31.35 |

Conventional Tip (seconds)

| Process | Weld | Total to Finish | | Difference (sec) | | % Change |
|---|---|---|---|---|---|---|
| Gate to Gate | 30.76 | 40.31 | | 14.58 | Improved | 36.2% |
| Pattern to Gate | 35.73 | 43.41 | | 12.06 | Improved | 27.8% |

Simulation of pattern to pattern was challenge; 13016

| Process | Weld | Total to Finish |
|---|---|---|
| Pattern to Pattern 1 | 31.38 | 52.49 |
| Pattern to Pattern 2 | 30.51 | 48.12 |

| Process | Weld | Total to Finish | | Difference (sec) | | % Change |
|---|---|---|---|---|---|---|
| Pattern to Pattern 1 | 40.15 | 68.06 | | 15.57 | Improved | 22.9% |
| Pattern to Pattern 2 | 40.43 | 64.24 | | 16.12 | Improved | 25.1% |

TABLE 1

FIG. 11

TABLE 2

WAX WELDING APPARATUS AND METHOD OF USE

FIELD

The present disclosure relates generally to wax welding for joining components of a wax assembly for use in investment casting. More specifically, this disclosure relates to wax welding tips, wax welding apparatuses, and methods of use.

BACKGROUND

The statements in this section merely provide background information related to the present disclosure and may not constitute prior art.

Wax welding has been performed through a variety of conventional processes. These processes are typically either designed for hobby welding and wood burning, garage-type solder welding, or high energy flame methods. Conventional methods require multiple subsequent process steps, can cause various environment issues, increase equipment replacement rates, and result in operator fatigue.

Soldering is a welding technique that is known. In at least some applications, soldering and welding can be used interchangeably as a process of joining two materials together. Typically, these terms are associated with joining metals together using a high temperature application at a particular location referred to as a joint. In many soldering and welding applications, thermal management and process control at a joint is challenging.

In a wax welding process, a tip is an instrument used to provide penetration along a weld plane where the heat from the tip is used to bring the surfaces to liquid temperatures, for example a temperature greater or equal to 250° F. This causes a liquid fusion of wax into one piece. As the tip is withdrawn, the desired effect is that the wax will flow in a continuously even pattern at the outside weld penetration point. However, in many wax welding applications, penetration is limited, heat is wasted, and poor welds result. Further, current wax welding systems cause the wax to erode and often require post-weld fill. Operators can experience fatigue, and tip smoke and build-up can occur from cool down. Therefore, many inefficiencies exist with current welding equipment and methods in the known art of wax welding.

SUMMARY

The present disclosure provides a wax welding tip operable to achieve a desired welding of wax components, particularly in an investment casting application. In an example, a welding tip for use in wax welding includes a base portion defining an exterior portion and an internal cavity. The internal cavity is adapted to receive a self-regulating heater. The welding tip includes an extension defining an upper surface and a lower surface. The extension is oriented relative to a longitudinal axis of the base portion. At least one of the upper surface and the lower surface of the extension are flat. In another example, both the upper and lower surfaces are flat wherein the extension defines a relatively thin profile as compared to a conventional welding tip. The extension defines a proximal end portion and a distal end portion. In a further example, the distal end portion is narrower than the proximal end portion.

The extension defines a perimeter that forms a geometric shape and extends from the proximal end portion to the distal end portion. The distal end portion can define a desired geometric shape, such as an arcuate end face. In yet another example, the extension is oriented at an acute angle relative to the base portion. In still a further example, the acute angle is about 25 degrees.

The exterior portion of the wax welding tip can define a circumferential flange or shoulder configured for positioning the tip relative to an adjacent component of a wax welding apparatus. The internal cavity of the base portion defines an inner surface. In an example, the inner surface is made of a copper material. The copper material can be a coating applied to the inner surface. In another example, at least a distal end portion of the extension includes an optional non-wetting material. The optional non-wetting material can be a coating applied to the distal end portion. In still a further example, the optional non-wetting coating is selected from the group consisting of chromium and nickel.

The welding tip according to the present disclosure can be formed of a tellurium copper alloy. The welding tip can be sized and shaped to accommodate various wax welding applications. In an example, the welding tip includes an extension defining an overall length of approximately 1.0 inch (2.54 cm). In another example, the extension defines a length of less than approximately 1.0 inch (2.54 cm). In yet a further example, the extension defines a length of approximately 0.8 inches (2.03 cm).

The present disclosure further provides for an apparatus for wax welding including a removable cartridge adapted for operative engagement with a power supply. The removable cartridge includes a tube defining a proximal end portion, a distal end portion, a longitudinal axis, and a hollow bore. A self-regulating heater is disposed within the tube. A wax welding tip is secured to the distal end portion of the tube, and more specifically within the hollow bore in one form of the present disclosure. The welding tip can define a proximal end portion having an internal cavity. The welding tip further defines an upper surface, a lower surface, and the tip is oriented relative to the longitudinal axis of the cartridge. The welding tip can be oriented at an acute angle. In another example, the apparatus further includes an ergonomic handle disposed around the tube.

In a further example, the present disclosure provides for a method of welding a wax pattern for use in investment casting. The method includes the steps of: providing a welding apparatus having a self-regulating heater disposed within a heatless tube and a heated welding tip; and inserting the heated tip between at least two wax components, thereby welding the two wax components together. The method can be performed manually. In another example, the method is automated and carried out robotically.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective, partially cut-away view of a prior art soldering/welding tool;

FIG. 2A is a perspective, partially cut-away view of another prior art soldering/welding tool having a self-regulating heating cartridge;

FIG. 2B is a side cross-sectional view of the prior art soldering/welding tool of FIG. 2A;

FIG. 3 is a perspective view of one form of a wax welding tool having a wax welding tip and a self-regulating heating cartridge constructed according to the teachings of the present disclosure;

FIG. 4 is a partial cross-sectional view of a portion of the tube of FIG. 3 taken along line 4-4;

FIG. 6A is a bottom perspective view of one form of a wax welding tip constructed in accordance with the teachings of the present disclosure;

FIG. 6B is a side perspective view of the wax welding tip of FIG. 6B;

FIG. 6C is a bottom view of the wax welding tip of FIG. 6A;

FIG. 6D is a side cross-sectional view of the wax welding tip of FIG. 6C, taken along line 6D-6D;

FIG. 6E is an end view of the wax welding tip of FIG. 6A illustrating a mounting opening for engaging a handle;

FIG. 7C is a bottom view of the wax welding tip of FIG. 7A;

FIG. 7D is a side cross-sectional view of the wax welding tip of FIG. 7C, taken along line 7D-7D;

FIG. 7E is an end view of the wax welding tip of FIG. 7A;

FIG. 8A is a bottom perspective view of yet another form of a wax welding tip constructed in accordance with the teachings of the present disclosure;

FIG. 8B is a side perspective view of the wax welding tip of FIG. 8A;

FIG. 8C is a bottom view of the welding tip of FIG. 8A;

FIG. 8D is a side cross-sectional view of the wax welding tip of FIG. 8C, taken along line 8D-8D;

FIG. 8E is and end view of the wax welding tip of FIG. 8A illustrating a mounting opening for engaging a handle;

FIG. 9A is a bottom perspective view of yet another form of a wax welding tip constructed in accordance with the teachings of the present disclosure;

FIG. 9B is a side perspective view of the wax welding tip of FIG. 9A;

FIG. 9C is a bottom view of the welding tip of FIG. 9A;

FIG. 9D is a side cross-sectional view of the wax welding tip of FIG. 9C, taken along line 9D-9D;

FIG. 9E is a top view of the wax welding tip of FIG. 9A illustrating a mounting opening for engaging a handle;

FIG. 10A is a bottom perspective view of yet another form of a wax welding tip constructed in accordance with the teachings of the present disclosure;

FIG. 10B is a side perspective view of the wax welding tip of FIG. 10A;

FIG. 10C is a bottom view of the welding tip of FIG. 10A;

FIG. 10D is a side cross-sectional view of the wax welding tip of FIG. 10C, taken along line 10D-10D;

FIG. 10E is a top view of the wax welding tip of FIG. 10A illustrating a mounting opening for engaging a handle;

Figure 12:

FIG. 11 shows Table 1 with data for a comparison between a conventional welding process (Conventional Process) and an improved thermal control welding process in accordance with the teachings of the present disclosure; and FIG. 12 shows Table 2 with data for manual break tests using the improved thermal management welding process in combination with a wax welding tip assembly in accordance with the teachings of the present disclosure.

The drawings described herein are for illustration purposes only and are not intended to limit the scope of the present disclosure in any way.

DETAILED DESCRIPTION

The present disclosure provides an apparatus and method of using a heat control technology with innovative welding tips and a heating cartridge designed for wax welding applications, and more particularly for welding wax patterns for use in investment casting. In one form, the present disclosure employs a soldering system that manages thermal conditions at a welding tip and thus better welding performance at a joint of two materials intended to be welded or soldered together. The soldering system includes a self-regulating temperature heater cartridge. A control system is coupled to the soldering system operable to manage temperature at the joint. However, a soldering system, designed for metal versus a wax welding application, operates fundamentally differently and thus a wax welding tip specifically designed to function with a soldering system having a self-regulating heating cartridge has been developed and thus provided by the present disclosure.

Referring to FIG. 1, a prior art conventional welding apparatus 10 typically includes a power source (not shown) coupled to a handle 11. A heater cartridge or element 12 is connected to the handle 11 at a proximal end 12A of the heater 12. A welding or soldering tip 13 extends from the heater 12 at a distal end 12B and is operable to distribute an intense and high amount of heat for melting of a desired surface or material. The power supply is coupled to the heater 12 such that electricity delivered to heater 12 generates heat which is then distributed to the welding tip 13. In this example, a temperature sensor 14 is provided at the heater 12 such that the power supply can adjust to manage thermal output. However, as discussed below, using this conventional process yields poor welding results both in terms of thermal control and effectiveness in management of wax materials. Moreover, the fine tip is unable to access enough of the mating wax surfaces in a wax joint.

FIGS. 2A-2B illustrate a self-regulating soldering apparatus 20, which is also disclosed in U.S. Pat. No. 5,427,846 and its related family of patents, the entire contents of which are incorporated herein by reference in their entirety. The soldering apparatus 20 includes a self-regulating welding tip 23 and a cartridge 22. Welding tip 23 in combination with heater cartridge 22 can be referred to as a welding element 200. The cartridge 22 can include a copper core surrounded by an outer magnetic layer (not shown). In this soldering apparatus 20, the outer magnetic layer is surrounded by a conductive wire coil 25. In combination, the coil 25 and the outer magnetic layer of the heater cartridge 22 allow for improved thermal control at the welding tip 23. In this example, the welding tip 23 is a "pencil-type." Soldering apparatus 20 includes an elongated shaft 26 surrounded by a handle 21. In this example, soldering apparatus 20 is connected to a power source through a connector 24. Power is delivered through the shaft 26 to cause the heater cartridge 22 to generate heat and further conduct heat to the tip 23 for desired welding or soldering. The advantage of soldering apparatus 20 is that the welding element 200 is self-regulating due to the relationship between the magnetic outer layer of heater cartridge 22 and coil 25.

The soldering tip 23 of FIGS. 2A-2B is of the pencil-type and is operable for intense heat delivery at a specific joint, particularly when joining two metal pieces together. However, for wax welding applications, this type of welding tip is unable to provide a desired surface uniformity. Both the welding apparatus 10 of FIG. 1 and soldering apparatus 20 of FIGS. 2A-2B presented issues when applied to wax welding applications, especially for wax welding assemblies for use in investment casting. Welding apparatus 10 provided inconsistent heat and an ineffective tip. Soldering apparatus 20, although providing consistent heat, caused wax erosion and thus both systems created more work for a wax welding operator.

FIGS. 3 and 4 illustrate a welding tool 30 having a wax welding tip 33 according to the teachings of the present disclosure. Welding tip 33 can be referred to as an "extension" as described in further detail below with reference to various welding tip forms. Welding tool 30 is adapted to achieve wax welding of two wax components in a way that provides uniform thermal treatment at and/or near a joint and ease of operator use. Moreover, in this form, welding tip 33 is able to operate in conjunction with a self-regulating heater cartridge application as previously described. The geometric shape and dimensions of the welding tip 33 allow for superior welding of wax materials, especially for wax assemblies for use in investment casting.

Welding tool 30 is adapted to connect to a power source (not shown) via a connector section 34 that extends from an elongated shaft 31 at a first proximal end 31A. At an opposite distal end 31B, a tube 32 is provided that includes an internal heater cartridge 37, shown in FIG. 4. In one form, the heater cartridge 37 can be a self-regulating heater cartridge and being the same type as previously described with reference to FIGS. 2A and 2B. Tube 32 is elongated and can be angled relative to a longitudinal axis defined by the elongated shaft 31 for ease of operator use. Alternately, the tube 32 may be straight or take on other angular orientations while remaining within the scope of the present disclosure.

Tube 32 further defines a proximal end portion 32A and a distal end portion 32B. Tube 32 includes a hollow bore 38 for receiving the welding tip 33 as shown across cross-section view taken along line 4-4. The welding tip 33 includes a base 36 that is secured to the distal end portion 32B of the tube 32. Welding tip 33 defines a proximal end portion 33A at base 36, a distal end portion 33B, and an internal cavity 38 within base 36 as best shown in FIGS. 6D, 6E, 7D, 7E, 8D and 8E. Welding tip 33 further defines an upper surface 33C and a lower surface 33D and is oriented relative to the tube 32, which extends from the shaft 31 as shown and extends from a base 36. The base 36 is connected to the tube 32 in one form of the present disclosure. The orientation of welding tip 33 can define an angle and in a particular form, the angle can be an acute angle in order to facilitate welding operations. For example, an elbow 35 is formed at or near the base 36 to allow for maneuvering the welding tip 33 around and through complex geometries and their surfaces for certain applications.

Figure 5A:
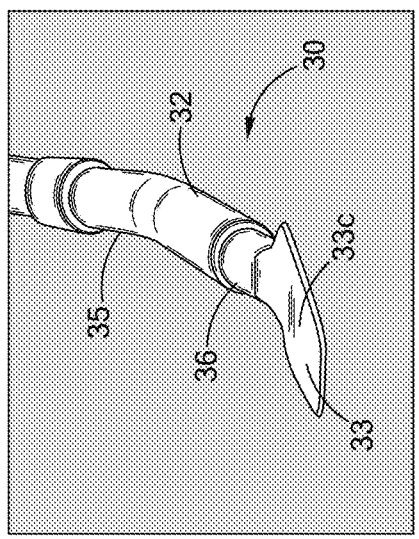
FIGS. 5A-5C are perspective views illustrating a method of wax welding using a wax welding tip and assembly according to the teachings of the present disclosure.
Figure 5C:
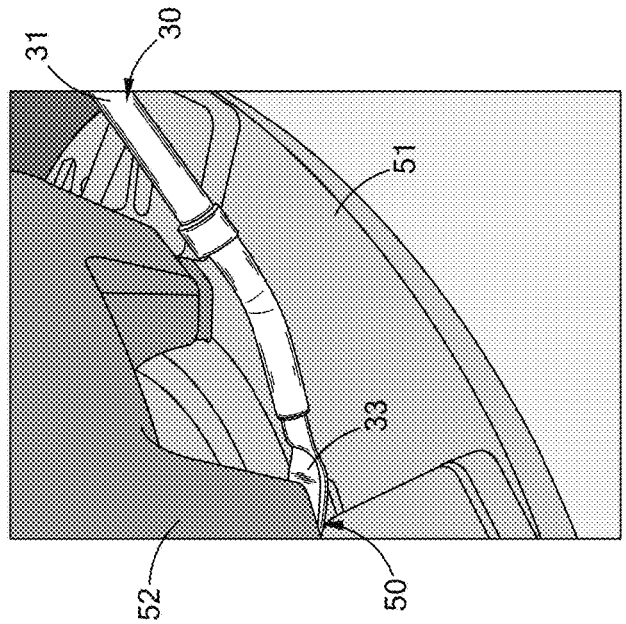
Figure 5B:
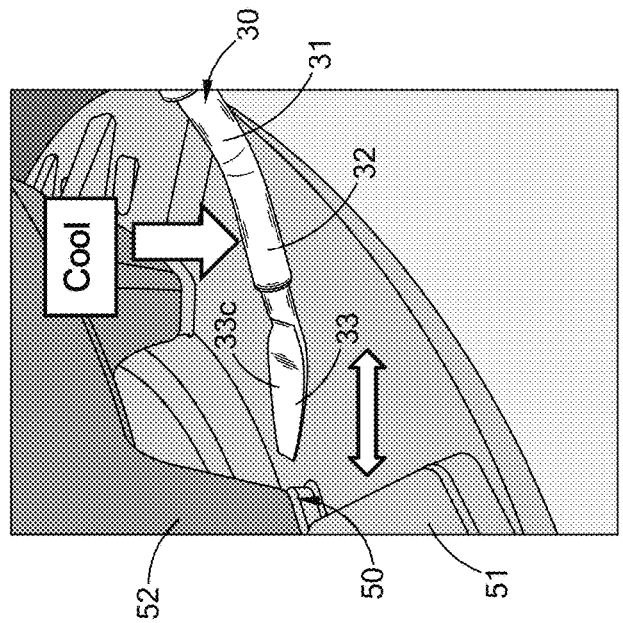
Figure 7B:
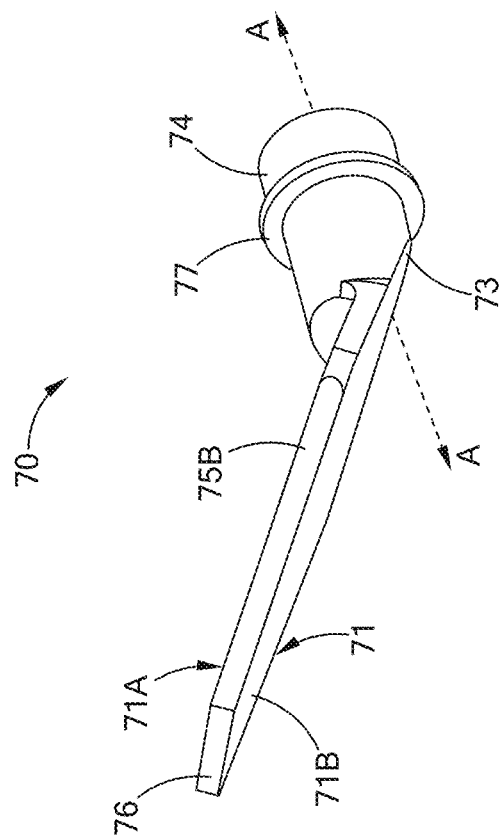
FIG. 7B is a side perspective view of the wax welding tip of FIG. 7A.
Figure 7A:
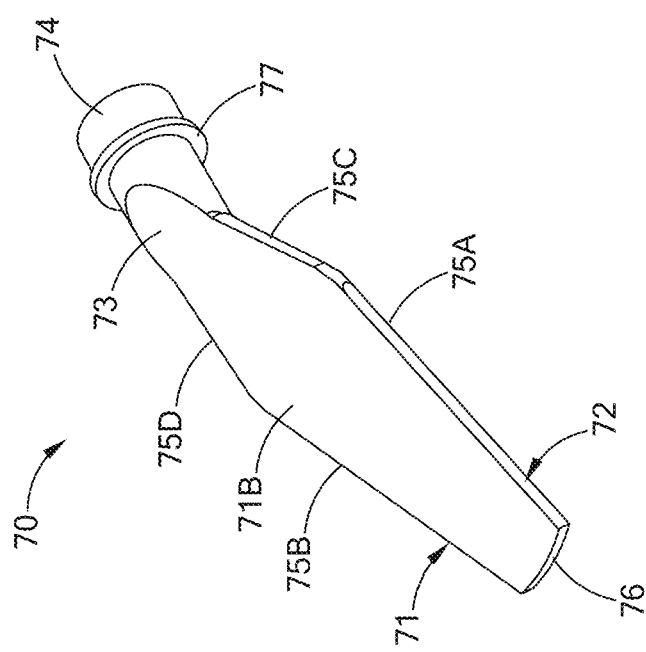
FIG. 7A is a bottom perspective view of another form of a wax welding tip constructed in accordance with the teachings of the present disclosure.

Referring now to FIGS. 5A-5C, the welding tip 33 was employed with a self regulating heater, and a welding method according to the present disclosure is thus illustrated. The operation uses one form of a welding tool 30 according to the teachings of the present disclosure. Welding tool 30 can be identical to welding tool described in FIG. 3 above, or it can take on other physical forms as set forth below. In the example of FIG. 5A, welding tool 30 is shown having a welding tip 33 connected to a tube 32 at the welding tip base 36. Tube 32 includes a heating cartridge 37 internal to the tube 36 and extends from the elongated shaft 31. Welding tip 33 defines an upper surface 33C and a lower surface 33D which form a relatively thin profile or comparatively smaller thickness. In this example, welding tip 33 can have a thickness of about 0.032 inches. This can allow for full penetration of the welded joint with, in one form, an elbow 35 positioned about 1 inch (2.54 cm) from and end portion of the welding tip 33 without causing wax erosion.

In FIG. 5B, the welding tool 30 is positioned to approach a joint 50 to be formed between a first wax component 51 and a second wax component 52. In this example, the tip work zone (within a plane defined by joint 50) is approximately 0.750 inches deep and welding tip 33 can be fully inserted into the weld plane due to the regulated heat being provided. Elbow 35 can be formed to reach around corners or otherwise access the required geometry at the joint 50. The area around elbow 35 is not hot and thus will not harm the wax components 51 and 52. FIG. 5C shows the welding tip 33 fully inserted in the welding plane in joint 50 between wax components 51 and 52. The operator can move relatively quickly without creating extra post-weld work with the tip 33 and heating system according to the teachings of the present disclosure.

In FIGS. 6A-6E, 7A-7E, 8A-8E, exemplary welding tips and cartridge connection features are shown. These tips are adapted to operate in conjunction with a self-regulating heater welding system. The welding tips of the present disclosure can provide angles that are predetermined and as well as a thin profile to provide a very "fine and clean" work with a constant heat delivery. Some example facets of the welding tip of the present disclosure include, but are not limited to:

Employing an elbow in a corresponding cartridge connection feature rather than in the welding tip. This can reduce metal stress and can yield consistent tip performance.

Use of a relatively "thin" welding tip (Approximately about 0.030-0.04 inches thick and in one form between 0.030-0.035 inches thick). If the welding tip is too thick, liquid wax erosion occurs.

With these tip features and others as described below, plus self-regulating heat (when the welding tip is placed down, for example, in a holder), an operator can work a desired weld area continuously without stopping due to poor tip performance or failure. The welding tip of the present disclosure can provide a safer work environment for operators by reducing fatigue. It can further reduce smoke. Weld quality can be improved as well as manufacturing span and labor costs.

FIGS. 6A-6E illustrate one form of a wax welding tip 60 according to the present disclosure. In this form, welding tip 60 includes a base portion 64 defining an internal cavity 68. The internal cavity 68 is adapted to receive a self-regulating heater (not shown). Welding tip 60 includes an extension 61 that is oriented relative to a longitudinal axis A-A of the base portion 64. Extension 61 includes an upper surface 61A and lower surface 61B wherein at least one of the upper or lower surfaces is flat. In this form, extension 61 defines flat upper and lower surfaces and is adapted to engage surfaces of wax components to create a desired joint or weld.

Welding tip 60 includes a perimeter 62 that extends from a proximal end portion 62A to a distal end portion 62B. The perimeter 62 defines a first geometric shape. In this example, the first geometric shape formed by perimeter 62 includes parallel side walls 65A and 65B and a curved or rounded tip section 66 positioned at the distal end 62B connecting walls 65A and 65B. In this example, tip section 66 defines an arcuate end face. Opposite end section 66 is a transition section 63 positioned at the proximal end 62A that extends from the base 64.

In an example, transition section 63 defines about a 25-degree angle of the extension 61 relative to the longitudinal axis A-A of base portion 64. However, other angles for the extension relative to the base portion are contemplated and within the scope of the present disclosure. The relative angle can be determined based on intended use and curvature of wax components. Base portion 64 can include an outwardly extending shoulder or flange 67 and defines an opening to internal cavity 68 (shown in FIGS. 6D and 6E). Side walls 65A and 65B can extend to the transition section 63 inwardly forming corresponding tapered walls 65C and 65D that extend towards the tube such that the width of the flat surface 61 is wider than that of base portion 64. Base portion 64 is formed to provide for connection to a heating element or cartridge (not shown).

Internal cavity 68 of the base portion 64 can define an inner surface being a copper material. The copper material can be a coating applied to the inner surface. Tip section 66 which is positioned at the distal end 62B relative to the base portion 64 can include an optional non-wetting material or an optional non-wetting coating. The optional non-wetting coating can be selected from the group consisting of chromium and nickel. The optional non-wetting material and coating is generally used to inhibit corrosion and thus lengthen the life of the tips. In yet a further example, the welding tip 60 is formed of a tellurium copper alloy. Welding tip 60 can have an extension 61 that defines an overall length of approximately 1.0 inch (2.54 cm) that extends from the tip section 66 to transition section 63. However, in other forms, the extension 61 defines a length of less than 1.0 inches measuring from the tip section 66 to the transition section 63. In a particular example, the length is 0.8 inches. In yet another example, the extension can define a length of greater than 1.0. inches measuring from the tip section 66 to the transition section 63. It should be understood that a self-regulating heater, or other type of heat transfer device may be in thermal communication with the welding tip 60 and that the specific internal cavity 68 should not be construed as limiting the scope of the present disclosure. A heat transfer device may be disposed around, within, or indirectly in contact with the welding tip 60 without departing from the teachings of the present disclosure.

The transition section 63 provides an additional beneficial feature according to the teachings of the present disclosure. As shown, the transition section 63 includes more material and thus has a greater thermal mass than other portions of the welding tip 60. With this greater thermal mass comes the ability to store heat for longer periods of time during operation. Also, the transition section 63 is in close proximity to the internal heater cartridge 37 (FIG. 4) and thus absorbs and stores more thermal energy than other portions of the welding tip 60. With certain materials used for the welding tip 60 and how they are manufactured, certain portions of the welding tip 60 such as the extension 61 can be plastically deformed during operation in order to adjust the specific angle needed by an operator during a welding operation. For example, the 25-degree angle could be increased (or decreased) when an operator places the extension 61 on a surface and gently presses against the surface. This additional adjustability has provided yet another advantage of the present disclosure.

FIGS. 7A-7E illustrate another form of a wax welding tip 70 according to the present disclosure. In this example, welding tip 70 includes a base portion 74 defining an internal cavity 78. The internal cavity 78 is adapted to receive a self-regulating heater (not-shown). Welding tip 70 includes an extension 71 that is oriented relative to a longitudinal axis A-A of the base portion 74. Extension 71 includes an upper surface 71A and lower surface 71B wherein at least one of the upper or lower surfaces is flat. In this example, extension 71 defines flat upper surface 71A and lower surface 71B and is adapted to engage surfaces of wax components to create a desired joint or weld. The flat surfaces of extension 71 define a relatively thin profile as compared to conventional pencil-type welding tips.

Welding tip 70 includes a perimeter 72 that defines a second geometric shape. In this example, the second geometric shape formed by the perimeter 72 includes non-parallel angled side walls 75A and 75B that extend away from a base portion 74 towards a shallow curved tip section 76 connecting walls 75A and 75B. Opposite tip section 76 is a transition section 73 that is formed on the base portion 74 extending away from section 71. In an example, transition section 73 defines about a 25-degree angle of the extension 71 relative to the longitudinal axis A-A of base portion 74. Base portion 74 can include an outwardly extending shoulder or flange 77 and define an opening to internal cavity 78 (shown in FIGS. 7D and 7E). Angled side walls 75A and 75B can extend to the transition section 73 inwardly forming corresponding tapered walls 75C and 75D that extend towards the base portion 74 such that the width of the flat section 71 at its widest point is wider than that of base portion 74. Base portion 74 is formed to provide for connection to a heating element or cartridge (not shown).

Internal cavity 78 of the base portion 74 can define an inner surface being a copper material. The copper material can be a coating applied to the inner surface. Tip section 76 which is positioned at a distal end relative to the base portion 74 can include an optional non-wetting material or an optional non-wetting coating. The optional non-wetting coating can be selected from the group consisting of chromium and nickel. In yet a further example, the welding tip 70 is formed of a tellurium copper alloy. Welding tip 70 can have an extension 71 that defines an overall length of approximately 1.0 inch (2.54 cm) that extends from the tip section 76 to transition section 73. However, in other examples the extension 71 can define a length of less than 1.0 inches measuring from the tip section 76 to the transition section 73. In a particular example, the length is 0.8 inches. In yet another example, the extension can define a length of greater than 1.0 inches measuring from the tip section 76 to the transition section 73.

FIGS. 8A-8E illustrate yet another form of a wax welding tip 80 according to the present disclosure. In this example, welding tip 80 includes a base portion 84 having an exterior portion defining an internal cavity 88. The internal cavity 88 is adapted to receive a self-regulating heater (not shown). Welding tip 80 includes an extension 81 that is oriented relative to a longitudinal axis A-A of the base portion 84. Extension 81 includes an upper surface 81A and lower surface 81B wherein at least one of the upper or lower surfaces is flat. In this example, extension 81 defines flat upper surface 81A and lower surface 81B and is adapted to engage surfaces of wax components to create a desired joint or weld. The flat surfaces of extension 81 define a relatively thin profile as compared to conventional pencil-type welding tips.

Welding tip 80 includes a perimeter 82 that defines a third geometric shape. In this example, the third geometric shape formed by the perimeter 82 includes parallel side walls 85A and 85B that extend away from a base portion 84 towards a shallow curved tip section 86 connecting walls 85A and 85B. Opposite tip section 86 is a transition section 83 that is formed on base portion 84 extending away from section 81. In an example, transition section 83 defines about a 25-degree angle of the extension 81 relative to the longitudinal axis A-A of base portion 84. Base portion 84 can include an outwardly extending shoulder or flange 87 and defines an opening to internal cavity 88 (shown in FIGS. 8D and 8E). Parallel side walls 85A and 85B can extend to the transition section 83 via tapered walls 85C and 85D that extend towards the base portion 84 such that the width of the flat section 81 is wider than that of base portion 84. Base portion 84 is formed to provide for connection to a heating element or cartridge (not shown). Other exemplary geometries are available and considered within the scope of the present disclosure.

Internal cavity 88 of the base portion 84 can define an inner surface being a copper material. The copper material can be a coating applied to the inner surface. Tip section 86 which is positioned at a distal end relative to the base portion 84 can include an optional non-wetting material or an optional non-wetting coating. The optional non-wetting coating can be selected from the group consisting of chromium and nickel. In yet a further example, the welding tip 80 is formed of a tellurium copper alloy. Welding tip 80 can have an extension 81 that defines an overall length of approximately 1.0 inch (2.54 cm) that extends from the tip section 86 to transition section 83. However, in other examples the extension 81 can define a length of less than 1.0 inches measuring from the tip section 86 to the transition section 83. In a particular example, the length is 0.8 inches. In yet another example, the extension can define a length of greater than 1.0. inches measuring from the tip section 86 to the transition section 83.

Referring now to FIGS. 9A-E, still another form of a welding tip is illustrated and generally indicated by reference numeral 90. The welding tip 90 generally includes beveled edges around its periphery and a transition section 93 that transitions more smoothly towards the extension 91. More specifically, welding tip 90 includes a base portion 94 defining an internal cavity 98. The internal cavity 98 is adapted to receive a self-regulating heater (not shown). Welding tip 90 includes an extension 91 that is oriented relative to a longitudinal axis A-A of the base portion 94. Extension 91 includes an upper surface 91A and lower surface 91B wherein at least a portion of the upper or lower surfaces is flat. As with previous forms, extension 91 defines flat upper and lower surfaces and is adapted to engage surfaces of wax components to create a desired joint or weld.

Welding tip 90 includes a perimeter 92 that extends from a proximal end portion 92A to a distal end portion 92B. The perimeter 92 generally defines beveled surfaces as shown. In this example, the beveled surfaces specifically include angled distal side walls 95A and 95B and a slightly curved tip section 96 positioned at the distal end 92B connecting sidewalls 95A and 95B. In this example, tip section 96 defines a slightly arcuate end face. Perimeter 92 further includes proximal side walls 95C and 95D that extend from distal side walls 95A and 95B tapering towards the base portion 94. Opposite end section 96 is a transition section 93 positioned at the proximal end 92A that extends from the base 94. Thus, extension 91 extends from base portion 94 at an angle relative to the longitudinal axis A-A formed base portion 94. Base portion 94 is formed to provide for connection to a heating element or cartridge (not shown).

In an example, transition section 93 defines about a 25-degree angle of the extension 91 relative to the longitudinal axis A-A of base portion 94. However, other angles for the extension relative to the base portion are contemplated and should be construed as being within the scope of the present disclosure. The relative angle can be determined based on intended use, operator specifications, and geometry of wax components to be welded, among others. Base portion 94 can include an outwardly extending shoulder or flange 97 and defines an opening to internal cavity 98 (shown in FIGS. 9D and 9E).

Internal cavity 98 of the base portion 94 can define an inner surface being a copper material. The copper material can be a coating applied to the inner surface. Tip section 96, which is positioned at the distal end 92B relative to the base portion 64, can include an optional non-wetting material or optional non-wetting coating. The optional non-wetting coating can be selected from the group consisting of chromium and nickel. In yet a further example, the welding tip 90 is formed of a tellurium copper alloy. Welding tip 90 can have an extension 91 that defines an overall length of approximately 1.0 inch (2.54 cm) that extends from the tip section 96 to transition section 93. However, in other forms, the extension 91 defines a length of less than 1.0 inches measuring from the tip section 96 to the transition section 93. In a particular example, the length is 0.8 inches. In yet another example, the extension can define a length of greater than 1.0. inches measuring from the tip section 96 to the transition section 93.

Upper surface 91A defines a raised flat surface 191 defined by two opposite side surfaces 191A and 191B and an end surface 191C. Surfaces 191A, 191B, and 191C are angled and tapered inward extending from the perimeter 92 towards raised flat surface 191. Lower surface 91B defines a lowered flat surface 291 defined by two opposite side surfaces 291A and 291B and an end surface 291C. Surfaces 291A, 291B, and 291C are angled and tapered inward extending from the perimeter 92 towards lowered flat surface 291. In an example, the side surfaces 191A and 191B extend from flat surface 191 at an acute angle. In yet another form, the acute angle is less than 5° and in still another form, the acute angle is 4°. In a further example, the side surfaces 291A and 291B extend from flat surface 291 at an acute angle. In yet another form, the acute angle is less than 5° and in still another form, the acute angle is 4°.

Referring now to FIGS. 10A-E, still another form of a welding tip is illustrated and generally indicated by reference numeral 110. The welding tip 110 generally includes beveled edges around its periphery and a transition section 113 that transitions more smoothly towards the extension 111. More specifically, welding tip 110 includes a base portion 114 defining an internal cavity 118. The internal cavity 118 is adapted to receive a self-regulating heater (not shown). Welding tip 110 includes an extension 111 that is oriented relative to a longitudinal axis A-A of the base portion 114. Extension 111 includes an upper surface 111A and lower surface 111B wherein at least a portion of the upper or lower surfaces is flat. As with previous forms, extension 111 defines flat upper and lower surfaces and is adapted to engage surfaces of wax components to create a desired joint or weld.

Welding tip 110 includes a perimeter 112 that extends from a proximal end portion 112A to a distal end portion 112B. The perimeter 112 generally defines beveled surfaces as shown. In this example, the beveled surfaces specifically include side walls 115A and 115B and a curved and rounded tip section 116 positioned at the distal end 112B connecting sidewalls 115A and 115B. Opposite rounded tip section 116 is the transition section 113 positioned at the proximal end 112A that extends from the base 114. Thus, extension 111 extends from base portion 114 at an angle relative to the longitudinal axis A-A formed base portion 114. Base portion 114 is formed to provide for connection to a heating element or cartridge (not shown).

In an example, transition section 113 defines about a 25-degree angle of the extension 111 relative to the longitudinal axis A-A of base portion 114. However, other angles the extension relative to the base portion are contemplated and should be construed as being within the scope of the present disclosure. The relative angle can be determined based on intended use, operator specifications, and geometry of wax components to be welded, among others. Base portion 114 can include an outwardly extending shoulder or flange 117 and defines an opening to internal cavity 118 (shown in FIGS. 9D and 9E).

Internal cavity 118 of the base portion 114 can define an inner surface being a copper material. The copper material can be a coating applied to the inner surface. Rounded tip section 116, which is positioned at the distal end 112B relative to the base portion 114, can include an optional non-wetting material or optional non-wetting coating. The optional non-wetting coating can be selected from the group consisting of chromium and nickel. In yet a further example, the welding tip 110 is formed of a tellurium copper alloy. Welding tip 110 can have an extension 111 that defines an overall length of approximately 1.0 inch (2.54 cm) that extends from the rounded tip section 116 to transition section 113. However, in other forms, the extension 111 defines a length of less than 1.0 inches measuring from the rounded tip section 116 to the transition section 113. In a particular example, the length is 0.8 inches. In yet another example, the extension can define a length of greater than 1.0. inches measuring from the rounded tip section 116 to the transition section 113.

Upper surface 111A defines a raised flat surface 1101 defined by two opposite side surfaces 1101A and 1101B and a rounded end surface 1101C. Surfaces 1101A, 1101B, and 1101C are angled and tapered inward extending from the perimeter 112 towards raised flat surface 1101. Lower surface 2101B defines a lowered flat surface 2101 defined by two opposite side surfaces 2101A and 2101B and a rounded end surface 2101C. Surfaces 2101A, 2101B, and 2101C are angled and tapered inward extending from the perimeter 112 towards lowered flat surface 2101. In an example, the side surfaces 1101A and 1101B extend from flat surface 1101 at an acute angle. In yet another form, the acute angle is less than 5° and in still another form, the acute angle is 4°. In a further example, the side surfaces 2101A and 2101B extend from flat surface 2101 at an acute angle. In yet another form, the acute angle is less than 5° and in still another form, the acute angle is 4°.

Consistent wax weld seam heat input (as previously described with reference to FIGS. 2A-2B application) throughout a wax weld process, proves to deliver a successful weld operation and wax weld quality while providing a safer operation and environment for the operator. The benefits of the wax welding tips and methods of the present disclosure include but are not limited to: 30% shorter weld time, high weld quality, excellent weld strength, full heat zone penetration which allows for welding larger thicknesses of wax material in a continuous motion, no need for pencil cool down during the weld process, reduction of after-weld tasks, such as weld finishing and blending, safer usage for the operator and opportunity for better ergonomics in-hand, less stress/strain is imposed on an operator's hand, wrist, and arm, as the process cuts through easily, reduced weld tip 'smoking' at set-down, fast start-up response time (approximately 4 seconds or less), and less energy consumption, particularly when the heating element is in a resting cradle.

Experiments were performed to determine the benefits of a constant thermal management welding system in use with a welding tip assembly according to the present disclosure. The purpose of a wax weld is to construct a combination of wax components into what is referred to as an 'assembly'. This assembly must survive the robust process steps of handling, and processing through a ceramic shell coating process. Therefore, the assembly should leave the wax welding process with high integrity welds that will not break or shear during the process steps. The weld process equipment should include at least these features:

Hot enough to melt and liquify the wax;
A constant temperature throughout the weld process from start to finish of the wax weld; and
Not require multiple tips due to wax weld heat loss.

In an actual production test utilizing a heating system and welding tip according to the present disclosure, operators reported less irritation to their hands, wrists and arms. They also reported less smoke in their workspace when they set the welding tip down in a holding cradle.

Using a self-regulating heater cartridge and welding tip according to the present disclosure, an assessment was made using actual part segments to establish normal hand weld movements and angles of reach. The data in Table 1 (FIG. 11) is a comparison of conventional welding process (Conventional Process) as compared to an improved thermal control welding process using a self-regulating heating cartridge and improved welding tip to illustrate the benefits of thermal management. (The first set of test pieces were wax blocks and plates, then the second set was actual pattern and gates sections).

In this test, each weld completion time was measured. Each weld time consists of 2 functions, (1) the weld and (2) the weld finish. Overall, improved process vs. conventional process, there is a 28% reduction in the total weld time. It can also be noted here that the weld finishing step time is approximately 33% in the improved process and approximately 20% in the conventional process. This is significant since in recent production environment, operators report that there is considerable improvement in the initial weld surface quality; in many cases it does not require a finishing step when using the welding tip and system according to the teachings of the present disclosure.

Manual break tests were conducted as summarized in Table 2 (FIG. 12) using the improved thermal management welding process in combination with a wax welding tip assembly according to the present disclosure. In the manual break tests, considerable force was required to fracture or break a wax weld. The breaks occurred outside of the weld zones in all but one case. Therefore, the welds were fused and structurally secure in all but one weld. In the exception case, the weld penetration was mis-aligned to the weld plane and resulted in an unacceptable weld.

Clearly, it was shown that an improved wax welding application with proper thermal management and a wax welding tip assembly according to the present disclosure is fast and responsive and offers several benefits. The system is favored by operators and presents the following benefits based upon performed tests:

Reduced weld time;
Reduced weld steps;
Fewer tips at the station due to weld heat loss;
Reduced smoke;

Reduced energy consumption;

Reduced operator body fatigue, stress/strain and pain;

Quick tip replacement;

Longer life of the power unit;

Longer life tips;

Less frequent replacements;

Improved welds, less failure; and

Adaptable for robotic wax welding.

Although typical wax welding temperatures are in the range of about 400-450° F., the welding tip in one form according to the present disclosure operates at much higher temperatures, for example, approximately 800-900° F. This higher operating temperature is a function of the material being used as the welding tip and its Curie temperature.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tip for use in wax welding, the tip comprising:
a base portion defining an exterior portion and an internal cavity, the internal cavity adapted to receive a self-regulating heater; and
an extension, the extension defining an upper surface and a lower surface, the lower surface being opposed and parallel to the upper surface; and
a transition section with a bottom tapering portion disposed and extending between the base portion and the extension, wherein the lower surface of the extension is aligned with and extends from the bottom tapering portion of the transition section, and the bottom tapering portion of the transition section and the lower surface of the extension are acutely angled relative to a longitudinal axis of the base portion.

2. The tip according to claim 1, wherein at least one of the upper surface and the lower surface of the extension are flat.

3. The tip according to claim 1, wherein the extension defines a proximal end portion and a distal end portion, and the distal end portion is narrower than the proximal end portion.

4. The tip according to claim 1, wherein a distal end portion defines an arcuate end face.

5. The tip according to claim 1, wherein a distal end portion defines a rounded end face.

6. The tip according to claim 1, wherein the extension is acutely angled relative to the longitudinal axis of the base at about 25 degrees.

7. The tip according to claim 1, wherein the exterior portion defines a circumferential flange and a shoulder configured for positioning the tip relative to an adjacent component of a wax welding apparatus.

8. The tip according to claim 1, wherein the extension defines a periphery having beveled edges.

9. The tip according to claim 1, wherein the internal cavity of the base portion defines an inner surface, the inner surface being a copper material.

10. The tip according to claim 9, wherein the copper material is a coating applied to the inner surface.

11. The tip according to claim 1, wherein at least a distal end portion of the extension includes a non-wetting material.

12. The tip according to claim 1, wherein the extension includes a non-wetting coating applied to at least a distal end portion thereof.

13. The tip according to claim 12, wherein the non-wetting coating is selected from a group consisting of chromium and nickel.

14. The tip according to claim 1, wherein the tip is formed of a tellurium copper alloy.

15. The tip according to claim 1, wherein the tip defines an overall length of about 1.0 inch (2.54 cm).

16. The tip according to claim 1, wherein the extension comprises rounded parallel sidewalls, and the upper surface and the lower surface define a thickness between 0.030 inches and 0.35 inches.

17. An apparatus for wax welding comprising:
a removable cartridge adapted for operative engagement with a power supply, the removable cartridge comprising:
a tube defining a proximal end portion, a distal end portion, a longitudinal axis, and a hollow bore; and
a self-regulating heater disposed within the tube; and
a tip secured to the distal end portion of the tube within the hollow bore, the tip defining a proximal end portion having an internal cavity, an upper surface, a lower surface, and rounded parallel side walls, the lower surface being opposed and parallel to the upper surface; and
a transition section with a bottom tapering portion disposed and extending between the distal end portion of the tube and the tip, wherein the lower surface of the tip is aligned with and extends from the bottom tapering portion of the transition section, and the bottom tapering portion of the transition section and the lower surface of the tip are acutely angled relative to the longitudinal axis of the cartridge.

18. The apparatus according to claim 17, wherein the tip defines an extension, the extension having a periphery defining beveled edges.

19. The apparatus according to claim 17 further comprising an ergonomic handle disposed around the tube.

* * * * *

UNITED STATES PATENT AND TRADEMARK OFFICE
CERTIFICATE OF CORRECTION

PATENT NO. : 11,084,113 B2  
APPLICATION NO. : 15/467864  
DATED : August 10, 2021  
INVENTOR(S) : Clark et al.

It is certified that error appears in the above-identified patent and that said Letters Patent is hereby corrected as shown below:

On the Title Page

Item (73) Assignee, please replace "PCC STRUCTURAIS, INC." with --PCC STRUCTURALS, INC.--.

Signed and Sealed this
Twenty-sixth Day of April, 2022

Katherine Kelly Vidal
*Director of the United States Patent and Trademark Office*